(12) United States Patent
Yu et al.

(10) Patent No.: US 11,698,640 B2
(45) Date of Patent: Jul. 11, 2023

(54) METHOD AND APPARATUS FOR DETERMINING TURN-ROUND PATH OF VEHICLE, DEVICE AND MEDIUM

(71) Applicant: APOLLO INTELLIGENT DRIVING TECHNOLOGY (BEIJING) CO., LTD., Beijing (CN)

(72) Inventors: Ning Yu, Beijing (CN); Fan Zhu, Beijing (CN); Yongyi Sun, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/917,191

(22) Filed: Jun. 30, 2020

(65) Prior Publication Data

US 2021/0096573 A1    Apr. 1, 2021

(30) Foreign Application Priority Data

Sep. 30, 2019   (CN) .......................... 201910941707.5

(51) Int. Cl.
*G05D 1/02* (2020.01)
*B60W 30/045* (2012.01)
(Continued)

(52) U.S. Cl.
CPC ......... *G05D 1/0219* (2013.01); *B60W 30/045* (2013.01); *B60W 40/04* (2013.01); *B60W 40/06* (2013.01); *G05D 1/0221* (2013.01); *B60W 2530/201* (2020.02); *B60W 2552/20* (2020.02); *B60W 2554/408* (2020.02)

(58) Field of Classification Search
CPC .... G05D 1/0219; G05D 1/0221; G05D 1/021; B60W 30/045; B60W 40/04; B60W 40/06; B60W 2554/408; B60W 2552/20; B60W 2530/201
See application file for complete search history.

(56) References Cited

U.S. PATENT DOCUMENTS 9,896,091 B1 * 2/2018 Kurt ...................... B60W 30/06
2006/0017881 A1   8/2006 Hashima et al.
(Continued)

FOREIGN PATENT DOCUMENTS

CN    108463690    8/2018
CN    109141441    1/2019
(Continued)

*Primary Examiner* — Jeff A Burke
*Assistant Examiner* — Joshua Alexander Garza
(74) *Attorney, Agent, or Firm* — Knobbe, Martens, Olson & Bear, LLP

(57) ABSTRACT

A method and apparatus for determining a turn-round path of a vehicle, a device and a storage medium are provided. An embodiment of the method includes: determining a starting position and a target position for the vehicle to turn round on a road; determining, based at least partially on road information associated with the road and vehicle information associated with the vehicle, a candidate turn-round path between the starting position and the target position; evaluating the feasibility of the candidate turn-round path; and determining, based on the evaluation on the feasibility, a turn-round path by which the vehicle is to turn round on the road.

18 Claims, 6 Drawing Sheets

(51) Int. Cl.
*B60W 40/04* (2006.01)
*B60W 40/06* (2012.01)

(56) References Cited

U.S. PATENT DOCUMENTS

| | | | | |
|---|---|---|---|---|
| 2011/0066303 | A1* | 3/2011 | Hara | G01S 5/021 |
| | | | | 701/1 |
| 2013/0289824 | A1* | 10/2013 | Mudalige | G08G 1/167 |
| | | | | 701/1 |
| 2016/0098496 | A1 | 4/2016 | Joshi et al. | |
| 2017/0083021 | A1* | 3/2017 | Balaghiasefi | G01C 21/3833 |
| 2017/0336218 | A1* | 11/2017 | Beaurepaire | G08G 1/167 |
| 2017/0369054 | A1* | 12/2017 | Nishimura | B60W 30/095 |
| 2018/0267548 | A1* | 9/2018 | Sumioka | G05D 1/0214 |
| 2018/0370532 | A1* | 12/2018 | Schein | B60W 40/06 |
| 2019/0001967 | A1* | 1/2019 | Micelli | B62D 15/0285 |
| 2019/0072973 | A1* | 3/2019 | Sun | B62D 15/0255 |
| 2019/0113927 | A1* | 4/2019 | Englard | G05D 1/0221 |
| 2019/0346851 | A1* | 11/2019 | Liu | B60W 60/00276 |
| 2021/0004016 | A1* | 1/2021 | Oh | G05D 1/0221 |
| 2021/0221355 | A1* | 7/2021 | Kang | B60W 30/095 |

FOREIGN PATENT DOCUMENTS

| | | |
|---|---|---|
| JP | 2019-006205 A | 1/2019 |
| JP | 2019020127 | 2/2019 |
| WO | WO 2013/051083 A1 | 4/2013 |
| WO | WO 2017/123232 | 7/2017 |
| WO | WO 2019/093190 A1 | 5/2019 |

* cited by examiner

METHOD AND APPARATUS FOR DETERMINING TURN-ROUND PATH OF VEHICLE, DEVICE AND MEDIUM

CROSS-REFERENCE TO RELATED APPLICATIONS

This application claims priority to Chinese Patent Application No. 201910941707.5, filed with the China National Intellectual Property Administration (CNIPA) on Sep. 30, 2019, the contents of which are incorporated herein by reference in their entirety.

TECHNICAL FIELD

Embodiments of the present disclosure generally relate to the field of computer technology, and more specifically to autonomous driving technology.

BACKGROUND

Autonomous driving (also known as unmanned driving) technology is an emerging technology in recent years. In the process of determining a traveling path for an autonomous vehicle, two processes of global path search and real-time path planning are performed conventionally. Global path search is usually performed based on a topological map. A feasible path may be searched from the topological map according to a starting point and a target point. After the global path search, real-time path planning is performed based on the searched path, to guide the vehicle to follow the searched path. However, in common turn-round scenarios of actual demonstration and operation of autonomous vehicles, vehicles often cannot complete turn-rounds according to the planned paths due to the limited executive abilities.

SUMMARY

Embodiments of the present disclosure provide a method and apparatus for determining a turn-round path of a vehicle, and an electronic device and a non-transitory computer-readable storage medium.

According to a first aspect of the present disclosure, a method for determining a turn-round path of a vehicle is provided. The method includes: determining a starting position and a target position for the vehicle to turn round on a road; determining, based at least partially on road information associated with the road and vehicle information associated with the vehicle, a candidate turn-round path between the starting position and the target position; and evaluating the feasibility of the candidate turn-round path; and determining, based on the evaluation on the feasibility, a turn-round path by which the vehicle is to turn round on the road.

According to a second aspect, an apparatus for determining a turn-round path of a vehicle is provided. The apparatus includes: a position determining module, configured to determine a starting position and a target position for the vehicle to turn round on a road; a candidate path selecting module, configured to determine, based at least partially on road information associated with the road and vehicle information associated with the vehicle, a candidate turn-round path between the starting position and the target position; an evaluating module, configured to evaluate the feasibility of the candidate turn-round path; and a path determining module, configured to determine, based on the evaluation on the feasibility, a turn-round path by which the vehicle is to turn round on the road.

According to a third aspect, an electronic device is provided. The electronic device includes: one or more processors; and a storage apparatus, storing one or more programs that, when executed by the one or more processors, cause the computing device to perform the method according to the first aspect.

According to a fourth aspect, a non-transitory computer-readable storage medium is provided, the medium stores a computer program, where when the program is executed by a processor, cause the processor to perform the method according to the first aspect.

It should be understood that what is described in the summary is not intended to limit key or important features of embodiments of the present disclosure, nor is it intended to limit the scope of the present disclosure. Other features of the present disclosure will be easily understood from the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements, in which.

DETAILED DESCRIPTION OF EMBODIMENTS

Figure 1:
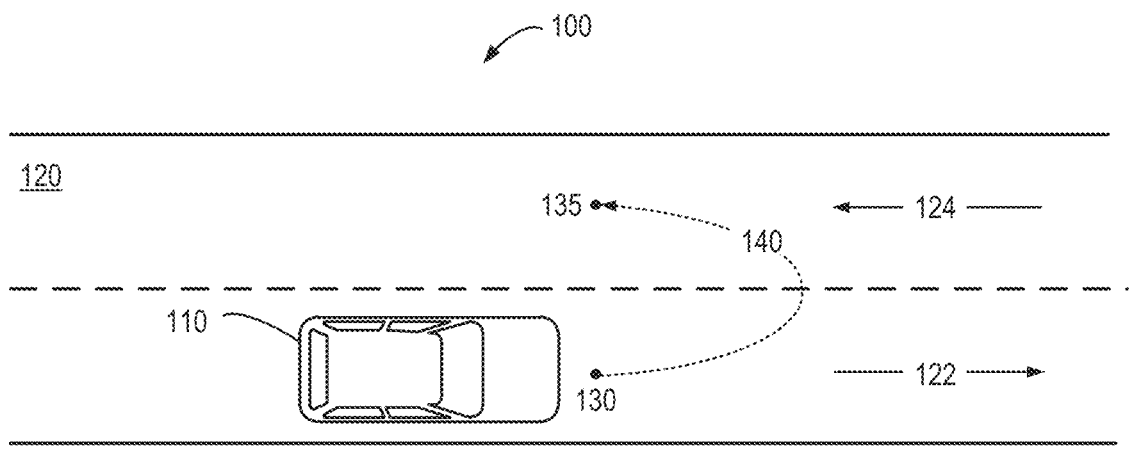
FIG. 1 shows a schematic diagram of an example environment in which multiple embodiments of the present disclosure may be implemented.

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The terms "first", "second" and the like may indicate different or identical objects. Other explicit and implicit definitions may also be included below.

In a scenario of turn-round of an autonomous vehicle, when a path is planned according to the conventional global path search and real-time path planning, the vehicle often cannot complete a turn-round according to the planned path due to limited executive ability. For path search and planning in such scenario, a reasonable turn-round position or whether the current driving ability can complete a turn-round within a given time or step in a specific candidate turn-round region needs to be considered.

Some embodiments of the present disclosure propose a solution for determining a turn-round path for a vehicle. The solution considers road information associated with a road and vehicle information associated with a vehicle. The road information includes, for example, road type, road width, and obstacles, etc. The vehicle information includes, for example, vehicle size, driving ability, etc. According to this solution, when the vehicle turns round in the road, a candidate turn-round path between a turn-round starting position and a target position of the vehicle is determined based at least partially on the road information and the vehicle information. After the candidate turn-round path is determined, the feasibility of the candidate turn-round path is evaluated. The evaluation may be performed, for example, based on historical statistical information associated with the road information, the vehicle information, the starting position, the target position and the candidate turn-round path. The historical statistical information may target at a success rate of the turn-round, a total time consumed by the turn-round, a number of forward and/or backward movements of the turn-round, and an obstacle avoidance ability of the vehicle. After the feasibility is evaluated, an actual turn-round path is determined based on the result of evaluation.

The solution for determining a turn-round path of a vehicle according to embodiments of the present disclosure considers vehicle information and road information during path search, and evaluates the feasibility of the searched path. In this way, the efficiency and success rate of search on the turn-round path of the vehicle are significantly improved.

FIG. 1 shows a schematic diagram of an example environment 100 in which embodiments of the present disclosure may be implemented.

As shown in FIG. 1, in the example of the environment 100, a vehicle 110 is driven on a road 120. The road 120 includes two two-way lanes 122 and 124 in two directions. It should be understood that the environment 100 shown in FIG. 1 is an example environment in which the vehicle may be driven. Besides outdoor roads, the vehicle may travel in various environments such as tunnels, outdoor parking lots, building interiors (for example, indoor parking lots), communities, or parks. It should also be understood that the road 120 may include any suitable number of lanes. For example, road 120 may include four two-way lanes in two directions, with two lanes in each direction.

The vehicle 110 may be any type of vehicle that can carry people and/or objects and moves by means of a power system such as an engine, including but not limited to cars, trucks, buses, electric vehicles, motorcycles, motor homes, trains, etc. The vehicle 110 may have certain level of autonomous driving ability or have no autonomous driving ability.

In the environment 100, the vehicle 110 is to complete a turn-round from a starting position 130 to a target position 135. FIG. 1 illustrates a candidate turn-round path 140 from the starting position 130 to the target position 135. The candidate turn-round path 140 is determined or searched based at least partially on road information associated with the road 120 and vehicle information associated with the vehicle 110. In various embodiments of the present disclosure, the feasibility of the candidate turn-round path 140 is also evaluated, and a turn-round path by which the vehicle 110 is going to travel on the road 140 is determined according to the evaluation result.

Figure 2:
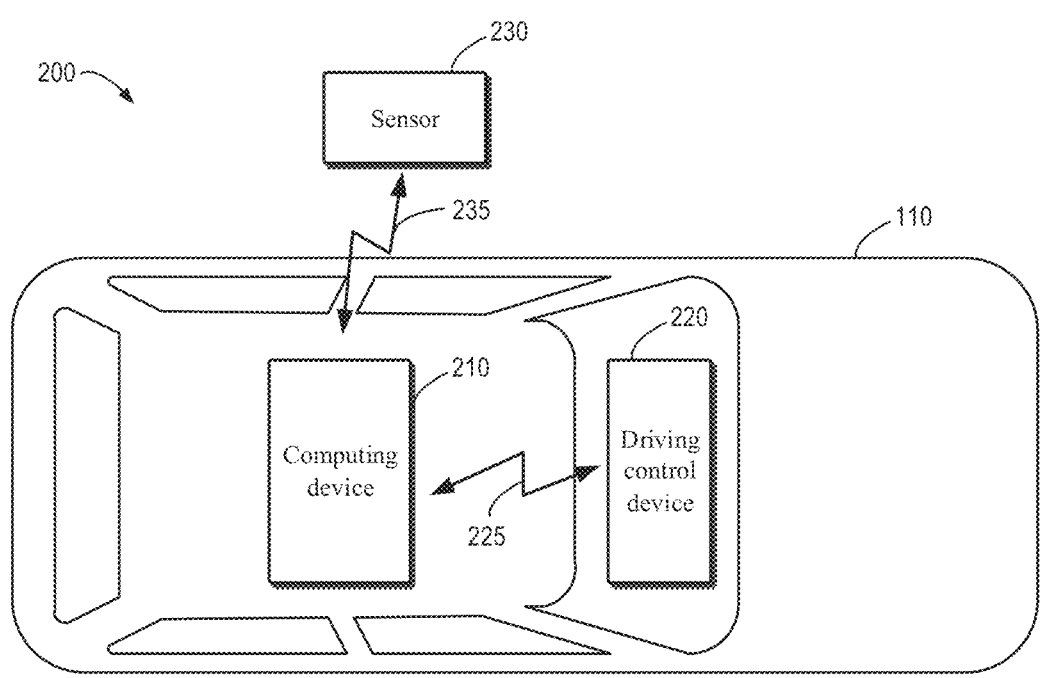
FIG. 2 shows a block diagram of a system for controlling autonomous driving of a vehicle by a computing device according to some embodiments of the present disclosure.

FIG. 2 shows a block diagram of an example system 200 for determining a turn-round path of a vehicle according to some embodiments of the present disclosure.

In the system 200, a computing device 210 is placed inside the vehicle 110 as an independent device for controlling the traveling of the vehicle 110. Particularly, the computing device 210 provides a decision making function for obstacle avoidance of the vehicle. The computing device 210 may also be integrated into the vehicle body and attached to the outside of the vehicle body, or be disposed at the external of the vehicle 110. The computing device 210 may even be remotely arranged, including, for example, a remote computer and a server. Alternatively, the computing device 210 may be arranged partially in the vehicle 110 and partially at the external of the vehicle 110.

The computing device 210 is a device having computing ability. The computing device 210 may be a device individually designed and packaged, including, but not limited to, a personal computer (PC), a laptop computer, a tablet computer, a personal digital assistant (PDA), a blade computer, a mobile phone, a smart device such as a wearable smart device, or the like. The computing device 210 may also be integrated into a device, for example, into the body of the vehicle 110, or into a user's mobile terminal (such as a mobile phone) or other smart device. For example, the user's mobile terminal may provide an application for implementing the functions of the computing device 210 described herein.

The system 200 further includes a driving control device 220 integrated in the vehicle 110, for controlling the driving of the vehicle. The driving control device 220 may control the operations of turning, driving, actuation, and the like of the vehicle 110, and may also control the behaviors of components such as turn lights, a horn, doors and windows, and an air conditioner of the vehicle 110.

In the system 200, the computing device 210 is arranged separately from the driving control device 220. The computing device 210 may communicate with the driving control device 220 through a link 225 to provide a determined obstacle avoidance method to the driving control device 220, so as to control the driving of the vehicle 110. The computing device 210 communicates with the driving control device 220 by a wired or wireless manner. In the example of wired communication, the computing device 210 may be connected to the driving control device 220 via a connecting component such as a wired interface, a cable, or a plug. In the example of wireless communication, the computing device 210 may establish a wireless communication connection with the driving control device 220 by means of various wireless communication technologies. The wireless communication technologies may be, for example, Internet of vehicles (V2X) technology, Wi-Fi, Bluetooth, wireless local area network (WLAN), metropolitan area network (MLAN), cellular communication technology, etc.

In some embodiments, the computing device 210 may be integrated in the driving control device 220. The driving control device 220 may also be integrated with other devices, for example, with a sensor 230 in the system 200.

The sensor 230 is arranged at the external of the vehicle 110, for monitoring the environment of the vehicle 110 to obtain sensing information related to the environment 100. Such sensing information may include road information in the environment 100, including various types of information such as road width, road type, and obstacles on the road. The sensor 230 may be arranged near the road 120 on which the vehicle is traveling, for example, on a side or both sides of the road 120. In some examples, in addition to being fixed at a particular location, the sensor 230 may also be movable, for example, movable sensing station, etc.

Examples of the sensor 230 may include, but are not limited to, an image sensor (such as a camera), a laser radar, a millimeter wave radar, an infrared sensor, a positioning sensor, a light sensor, a pressure sensor, a temperature sensor, a humidity sensor, a wind speed sensor, a wind direction sensor, an air quality sensor, a motion sensor, and the like. The image sensor may sense image information related to the environment 100; the laser radar and the millimeter wave radar can sense laser point cloud data related to the environment 100; the infrared sensor may detect an environmental status in the environment 100 by means of infrared rays; the positioning sensor may sense position information of objects related to the environment 100; the light sensor may sense a metric value indicating the intensity of illumination in the environment 100; the pressure, temperature and humidity sensors may sense metric values indicating the pressure, temperature, and humidity in the environment 100, respectively; the wind speed and wind direction sensors may sense metric values indicating the wind speed and the wind direction in the environment 100, respectively; the air quality sensor may sense some indicators related to air quality in the environment 100, such as oxygen concentration, carbon dioxide concentration, dust concentration, pollutant concentration, etc. in air. The motion sensor may sense motion states of objects in the environment 100 (including the vehicle 110 and other objects on the road 120), such as motion direction and motion speed. The motion sensor includes, for example, an accelerometer that can sense information related to the acceleration of an object, and a gyroscope that can be used to detect the angular motion of the object.

In an embodiment, the sensor 230 may perform multiple sensing functions, or be an integration of multiple sensors. In some embodiments, besides the sensor 230, one or more other sensors may be arranged in the system 200. The other sensors and the sensor 230 are of different types. Multiple different types of sensors may be integrated at a certain location, or distributed in various regions of the environment 100 for monitoring specific types of sensing information.

When controlling the traveling of the vehicle 110, the computing device 210 may receive relevant sensing information of the environment 100 of the vehicle 110 from the sensor 230 through the wireless communication link 235, and determine an instruction to control the traveling of the vehicle 110 based on the acquired information. In the example arrangement of the system 200 shown in FIG. 2, the computing device 210 communicates with the sensor 230 through the wireless link 225. The wireless communication may be performed using various wireless communication technologies as described above.

In some embodiments, the sensor 230 may be arranged in the vehicle 110. In these embodiments, in addition to the wireless manner, the computing device 210 may also communicate with the sensor 230 in a wired manner as described above. In some embodiments, the computing device 210 may be integrated with the sensor 230. Alternatively or additionally, the computing device 210 may be integrated with other sensors (not shown) and also obtain sensing information from the integrated sensors, to determine an instruction to control the traveling of the vehicle 110.

Figure 3:
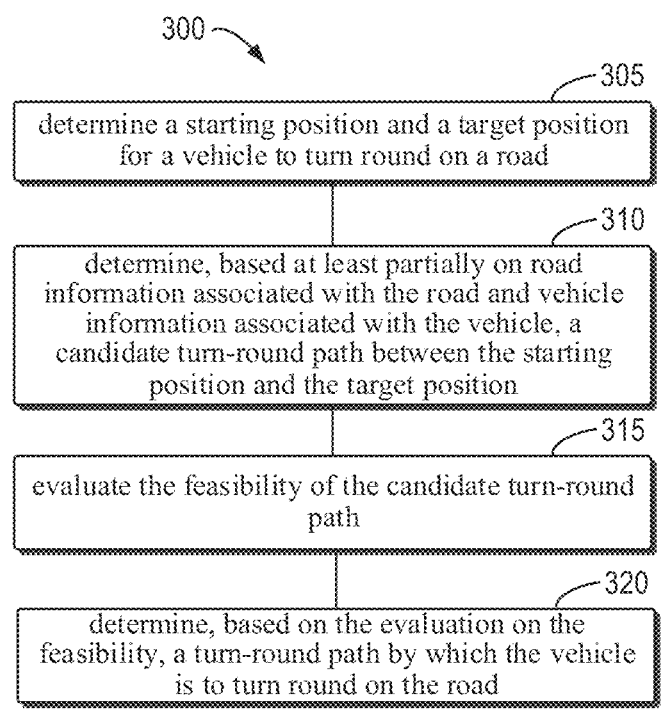
FIG. 3 shows a flowchart of a method for obstacle avoidance of a vehicle according to some embodiments of the present disclosure.

FIG. 3 shows a flowchart of a method 300 for determining a turn-round path of a vehicle according to an embodiment of the present disclosure. The method 300 may be implemented by the computing device 210 shown in FIG. 2. For ease of discussion, the method 300 will be described below with reference to FIG. 1 and FIG. 2.

At block 305, the computing device 210 determines a starting position 130 and a target position 135 for the vehicle 110 to turn round on the road 120. The starting position 130 and the target position 135 are related to the current position of the vehicle 110. In some embodiments, restrictions such as traffic rules may be considered. For example, some lanes or locations do not allow a turn-round, the starting position 130 of turn-round needs to avoid corresponding lanes or locations.

In some embodiments, the starting position 130 and the target position 135 for the vehicle 110 to turn round may be determined by means of a topological map of the road 120. The topological map may be created based on road information associated with the road 120. The road information includes, for example, information about the type of the road, for example, the type and number of lanes in the road (one-way, two-way, multi-lane, etc.); information about the width of the road, such as lane width; information about traffic element indications (such as an indication about whether turn-round is allowed, e.g., a turn-round symbol, an intersection, a ring road, etc.); information about obstacles on the road, for example, whether there are obstacles, the type of obstacles, etc.

The topological map of the road 120 may be implemented in any appropriate form. For example, the topological map may be composed of nodes and edges connecting the nodes. The nodes may correspond to a lane, and the connecting relationship between lanes corresponds to the edges connecting the nodes. The connecting relationship (i.e., edges) may describe travelable directions of the vehicle in different lanes.

In some embodiments, the topological map may be implemented as a grid map, where the grids may be square, triangular, hexagonal, etc. The size of the grids may be determined in consideration of any suitable factor and based on any suitable criteria. For example, the size of the grids may be set according to the size of the vehicle or the width of lanes. Accordingly, the starting position 130 and the target position 135 may be mapped to corresponding grids in the grid map.

At block 310, the computing device 210 determines, based at least partially on road information associated with the road 120 and vehicle information associated with the vehicle 110, a candidate turn-round path 140 between the starting position 130 and the target position 135. The road information may include any appropriate information related to the road. For example, as described above, the road information may include information about the type of the road, information about the width of the road, information about traffic element indications, information about obstacles on the road, etc.

The vehicle information may include any appropriate information associated with the vehicle 110. For example, the vehicle information may include information about the size of the vehicle, such as vehicle length, vehicle width, and vehicle height. The vehicle information may also include information associated with the driving ability of the vehicle 110, for example, the distance from the rear axle center of the vehicle 110 to the front boundary of the vehicle, the distance from the rear axle center of the vehicle 110 to the rear boundary of the vehicle, the distance from the rear axle center of the vehicle 110 to the left boundary of the vehicle, the distance from the rear axle center of the vehicle 110 to the right boundary of the vehicle, the minimum turning radius of the vehicle 110, the maximum wheel angle, the wheelbase, etc. In addition, the vehicle information may also include information about control errors of the vehicle 110, such as a longitudinal control error of forward traveling of the vehicle, a transverse control error of forward traveling of the vehicle, a forward traveling azimuth error of the vehicle, a longitudinal control error of backward traveling of the vehicle, a transverse control error of backward traveling of the vehicle, an azimuth error of the backward traveling of the vehicle, etc.

When determining candidate turn-round path 140, the road information and the vehicle information may be used in any suitable manner. In some embodiments, a moving cost of the candidate turn-round path 140 may be determined based on the road information and the vehicle information, the moving cost being related to the length of the candidate turn-round path 140. A specific example is discussed below with reference to FIG. 4.

Figure 4:
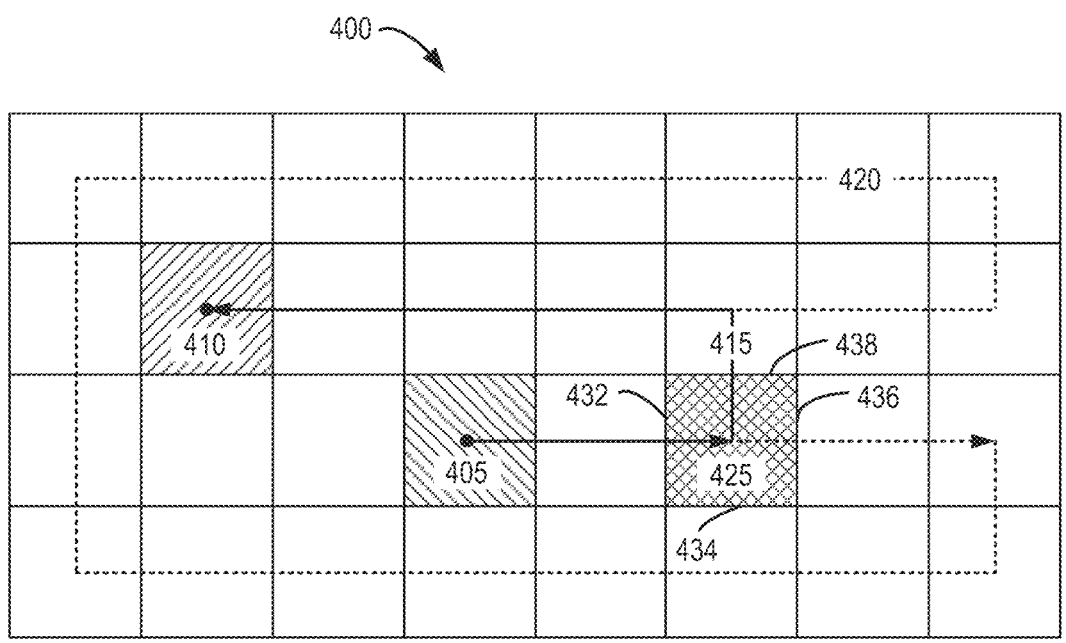
FIG. 4 shows an example process of searching a candidate turn-round path based on a topological map of a road according to some embodiments of the present disclosure.

FIG. 4 shows an example process of searching a candidate turn-round path based on a topological map of a road according to some embodiments of the present disclosure.

In this example, the topological map of the road 120 is implemented by a grid map 400, where each grid is square. The road 120 includes two-way single-lanes represented by four rows of grids.

In the grid map 400, grids 405 and 410 correspond to the starting position 130 and the target position 135, and are named as a starting grid 405 and a target grid 410, respectively. Travelable paths from the starting grid 405 to the target grid 410 may be searched from the grid map 400. Any suitable path search algorithm may be used, for example, a global path search algorithm such as an A* algorithm. Other algorithms are also feasible. In this example, two travelable paths 415 and 420 are searched, and each travelable path corresponds to a candidate turn-round path from the starting position 130 to the target position 135.

The moving costs of the passable paths 415 and 420 may be determined based on the road information and the vehicle information. For example, taking the grid 425 as an example, weights e1, e2, e3 and e4 are respectively assigned to the four edges 432, 434, 436 and 438, indicating the costs of moving along the corresponding edges. The weights may be determined based on relevant information of positions on the road corresponding to the grid 425 and the vehicle information. For example, the grid corresponding to a larger space in the turn-round region has a lower weight, while the grid corresponding to a narrower space has a higher weight. Alternatively or additionally, the grid near an obstacle has a higher weight. In addition, the larger vehicle has a higher weight, and the smaller vehicle has a lower weight. The weights may also be associated with moving directions. For example, the moving directions may be forward, backward, left forward, right forward, left backward, right backward, respectively representing forward traveling, backward traveling, left forward traveling, right forward traveling, left backward traveling, right backward traveling, etc. Each kind of movement may be set with a different weight. After the weights of the edges of the grids are determined, the moving costs may be calculated by summing the weights of the edges of the grids by which the travelable paths 415 and 420 pass.

Then, a travelable path (corresponding to a candidate turn-round path) may be selected, based on the moving costs, from the plurality of passable paths 415 and 420 (corresponding to a plurality of candidate turn-round paths). For example, the overall goal may be to find a travelable path that connects the starting grid 405 and the target grid 410 with a minimum moving cost (or lower than a threshold), which corresponds to a candidate turn-round path to be selected.

In some embodiments, the determination of the candidate turn-round path 140 may also consider the type of the path, and different priorities may be set for different types of paths. For example, the priority of a three-point turn-round path may be set as higher than the priorities of non-three-point turn-round paths. In the non-three-point turn-round paths, paths such as a U-turn and a detour may also be set with different priorities. For example, the priority of the U-turn may be higher than that of the detour. In this case, the path of a higher priority is preferentially selected. For example, if there is a three-point turn-round path, the three-point turn-round path is preferentially determined as the candidate turn-round path. Otherwise, a non-three-point turn-round path is determined as the candidate turn-round path. Among the non-three-point turn-round paths, the U-turn path is preferentially determined as the candidate turn-round path, followed by the detour path, and so on. If the paths of a certain priority include multiple candidate turn-round paths, a candidate turn-round path may be selected therefrom based on the road information and the vehicle information.

In some embodiments, the determination of the candidate turn-round path 140 may also consider the information about the starting position 130 and/or the target position 135. For example, the information may include the position of the current lane 122, the distance from the center line of the current lane 122 to the left boundary of the lane 122, the distance from the center line of the current lane 122 to the right boundary of the lane 122, the type of the left boundary of the current lane 122 (for example, a solid line or a dotted line), the location of a target lane 124, the distance from the center line of the target lane 124 to the left boundary of the lane 124, the distance from the center line of the target lane 124 to the right boundary of the lane 124, or the type of the left boundary of the target lane 124 (for example, a solid line or a dotted line). A region having a large turn-round space may be preferentially selected.

Next, with continued reference to FIG. 3, at block 315, the computing device 210 evaluates the feasibility of the candidate turn-round path. The feasibility may be evaluated in consideration of any appropriate factors. For example, the evaluation may be based on historical statistical data associated with the current scenario (for example, the vehicle information, the road information, the starting position 130 and the target position 135, the candidate turn-round path 140). The statistical data may be related to the following: success rate of the turn-round, total time consumed by the turn-round, number of forward and backward movements of turn-round, and/or obstacle avoidance ability, etc. The historical statistical data may be used as references for evaluating the feasibility of turn-round in similar scenarios.

Whether a new candidate turn-round path is to be re-determined may be determined based on whether the feasibility is higher than a threshold. For example, if the turn-round success rate is lower than a predetermined threshold success rate, the total time consumed by the turn-round is lower than a predetermined threshold duration, and/or the number of forward and backward movements is smaller than a predetermined threshold number, etc., it is determined that the feasibility of the candidate turn-round path is higher than a predetermined threshold. Accordingly, it can be evaluated that the vehicle 110 can complete the turn-round on the candidate turn-round path 140. Otherwise, it is determined that the feasibility of the candidate turn-round path is lower than the predetermined threshold, and it can be evaluated that the vehicle 110 cannot complete a turn-round.

At block 320, the computing device 210 determines, based on the evaluation on the feasibility, a turn-round path on which the vehicle 110 is to travel on the road 120. For example, if it is evaluated that the vehicle 110 can complete a turn-round, the candidate turn-round path is determined as a turn-round path on which the vehicle 110 is to travel. Then, real-time path and speed planning can be performed. If it is evaluated that the vehicle 110 cannot complete a turn-round on the candidate turn-round path 140, or there is a risk in completing the turn-round, a new candidate turn-round path is searched again. For example, replacing the path or selecting a turn-round region having larger space may be considered, to plan a path again. The process of determining a turn-round path may be repeated until a path for successful turn-round is found or it is determined that the target position cannot be reached.

Figure 5:
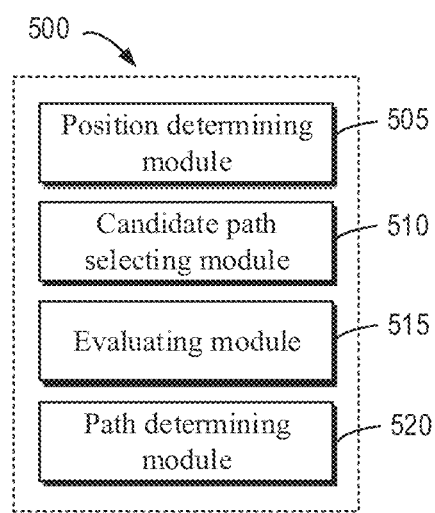
FIG. 5 shows a block diagram of an apparatus for obstacle avoidance of a vehicle according to some embodiments of the present disclosure.

FIG. 5 shows a schematic block diagram of an apparatus 500 for obstacle avoidance of a vehicle according to an embodiment of the present disclosure. The apparatus 500 may be included in the computing device 210 of FIG. 2 or implemented as the computing device 210.

As shown in FIG. 5, the apparatus 500 includes: a position determining module 505, configured to determine a starting position 130 and a target position 135 for the vehicle 110 to turn round on the road 120; a candidate path selecting module 510, configured to determine, based at least partially on road information associated with the road 120 and vehicle information associated with the vehicle 110, a candidate turn-round path 140 between the starting position 130 and the target position 135; an evaluating module 515, configured to evaluate the feasibility of the candidate turn-round path 140; and a path determining module 520, configured to determine, based on the evaluation on the feasibility, a turn-round path by which the vehicle 110 passes to turn round on the road 120.

In some embodiments, the road information includes at least one of the following: information about a type of the road 120, information about a width of the road 120, information about traffic element indications, and information about obstacles on the road 120.

In some embodiments, the vehicle information includes at least one of the following: information about the size of the vehicle 110, information about the driving ability of the vehicle 110, and information about driving control errors of the vehicle 110.

In some embodiments, the candidate path selecting module 510 also determines the candidate turn-round path 140 based on the information about at least one of the starting position 130 and the target position 135.

In some embodiments, the candidate path selecting module 510 includes: a cost determining module, configured to determine, for each candidate turn-round path of a plurality of candidate turn-round paths between the starting position 130 and the target position 135, a moving cost related to the length of the each candidate turn-round path based at least partially on the road information and the vehicle information; and a selecting module, configured to select, based on the moving costs of the plurality of candidate turn-round paths, the candidate turn-round path 140 from the plurality of candidate paths.

In some embodiments, the cost determining module also determines the moving cost based on the moving direction of the each candidate turn-round path of the plurality of candidate turn-round paths.

In some embodiments, the plurality of candidate paths are of a same priority, a priority is determined based on the types of the plurality of candidate turn-round paths, and the priority is higher than a predetermined threshold priority.

In some embodiments, the evaluating module 515 includes: a first evaluating module, configured to evaluate the feasibility of the candidate turn-round path 140 based on historical statistical information about at least one of: a success rate of the turn-round, a total time consumed by the turn-round, a number of forward and/or backward movements of the turn-round, or an obstacle avoidance ability of the vehicle.

In some embodiments, the historical statistical information is associated with at least one of the following: the road information, the vehicle information, the starting position, the target position, or the candidate turn-round path.

In some embodiments, the path determining module 520 includes: a first determining module, configured to determine whether the feasibility of the candidate turn-round path 140 is higher than a predetermined threshold; and a second determining module, configured to re-determine a new candidate turn-round path according to the determination that the feasibility is lower than the predetermined threshold.

In some embodiments, the path determining module 520 further includes: a third determining module, configured to determine, according to the determination that the feasibility is higher than the predetermined threshold, the candidate turn-round path 140 as the turn-round path by which the vehicle is to travel on the road.

It should be understood that the modules described in the apparatus 500 correspond to the respective steps in the method 300 described with reference to FIGS. 1 to 4. Therefore, the operations and features described above with reference to FIGS. 1 to 4 are also applicable to the apparatus 500 and the modules included therein and have the same effects, and details are not described herein again.

Figure 6:
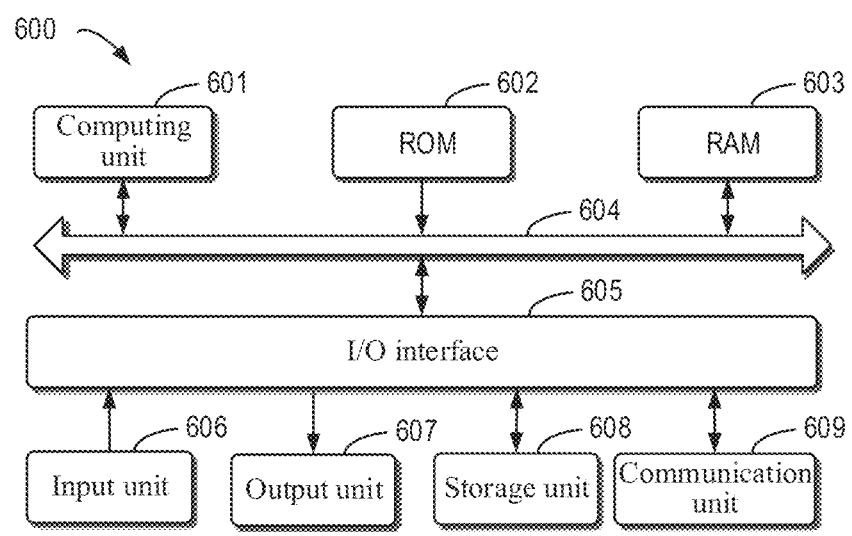
FIG. 6 shows a block diagram of a device capable of implementing multiple embodiments of the present disclosure.

FIG. 6 illustrates a schematic structural block diagram of an example device 600 adapted to implement embodiments of the present disclosure. The device 600 may be used for implementing the computing device 210 in FIG. 2.

As shown in FIG. 6, the device 600 includes a computing unit 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system X00. The computing unit 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising various types of displays and speakers etc.; a storage portion 608 including a magnetic disk, an optical disk, and the like; and a communication portion 609 comprising a network interface card, such as a network adapter, a modem, and a wireless communication transceiver. The communication portion 609 allows the device 600 to communicate information/data with other devices via a network, such as the Internet and/or Various telecommunication networks.

The computing unit 601 may be various general-purpose and/or special-purpose processing components having processing and computing capabilities. Some examples of the computing unit 601 include, but are not limited to, a central processing unit (CPU), a graphics processing unit (GPU), various special-purpose artificial intelligence (AI) computing chips, various computing units running machine learning model algorithms, and digital signal processing Processor (DSP), and any suitable processor, controller, microcontroller, etc. The calculation unit 601 performs various methods and processes described above, such as the method 300. For example, in some embodiments, the method 300 may be implemented as a computer software program that is tangibly embodied on a machine-readable medium, such as the storage unit 608. In some embodiments, part or all of the computer program may be loaded and/or installed on the device 600 via the ROM 602 and/or the communication unit 609. When a computer program is loaded into the RAM 603 and executed by the computing unit 601, one or more steps of the method 300 described above may be performed. Alternatively, in other embodiments, the computing unit 601 may be configured to perform the method 300 in any other suitable manner (for example, by means of firmware).

The functions described above herein may be performed, at least in part, by one or more hardware logic components. For example, without limitation, example types of hardware logic components that can be used include: Field Programmable Gate Array (FPGA), Application Specific Integrated Circuit (ASIC), Application Specific Standard Product (ASSP), System on a Chip (SOC), Complex Programmable Logic Device (CPLD), etc.

Program codes for implementing a method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely example forms of implementing the claims.

What is claimed is:

1. A method for determining a turn-round path of a vehicle, comprising:

determining, by a processor, a starting position and a target position for the vehicle to turn round on a road based on road information associated with the road, wherein the starting position and the target position for the vehicle to turn round on the road are determined by means of a topological map of the road, the topological map is implemented as a grid map, and a size of the grids is set according to a size of the vehicle or a width of lanes, and the starting position and the target position are mapped to corresponding grids in the grid map;

determining, based at least partially on the road information associated with the road and vehicle information associated with the vehicle, a candidate turn-round path between the starting position and the target position on basis of the topological map implemented as the grid map;

evaluating, before controlling the vehicle to turn round on the road according to the candidate turn-round path, feasibility of the candidate turn-round path based on: statistical information about historical success rate of historical turn-rounds associated with the starting and target positions and the vehicle information, or statistical information about historical numbers of forward and backward movements of the historical turn-rounds associated with the starting and target positions and the vehicle information; and determining a turn-round path based on the evaluation on the feasibility, and controlling the vehicle to turn round on the road according to the determined turn-round path, wherein the determining, based at least partially on road information and vehicle information, a candidate turn-round path comprises:

selecting a plurality of candidate turn-round paths of a type of a highest priority in available turn-round paths, wherein a priority of a three-point turn-round path is higher than a priority of a U-turn, the priority of the U-turn is higher than a priority of a detour;

determining, for each candidate turn-round path in the plurality of candidate turn-round paths between the starting position and the target position, a moving cost related to a length of the each candidate turn-round path based at least partially on the road information and the vehicle information; and selecting, based on the moving costs of the plurality of candidate turn-round paths, the candidate turn-round path from the plurality of candidate paths.

2. The method according to claim 1,
wherein the road information associated with the road comprises at least one of the following:
information about a type of the road,
information about a width of the road,
information about traffic element indications, or
information about obstacles on the road.

3. The method according to claim 1, wherein the evaluating the feasibility of the candidate turn-round path comprises:
evaluating the feasibility of the candidate turn-round path based on:
statistical information about historical success rate of historical turn-rounds associated with the starting and target positions and a length of the vehicle, and
statistical information about historical numbers of forward and backward movements of the historical turn-rounds associated with the starting and target positions and the length of the vehicle.

4. The method according to claim 1, wherein the determining a candidate turn-round path is also based on the information about at least one of the starting position and the target position.

5. The method according to claim 1, wherein the determining a moving cost is also based on a moving direction of the each candidate turn-round path of the plurality of candidate turn-round paths.

6. The method according to claim 1, wherein the evaluating the feasibility of the candidate turn-round path comprises:
evaluating the feasibility of the candidate turn-round path based on:
statistical information about historical success rate of historical turn-rounds, the historical turn-rounds being associated with the starting and target positions and longitudinal and lateral control errors of forward traveling of the vehicle, and
statistical information about historical numbers of forward and backward movements of the historical turn-rounds associated with the starting and target positions and the longitudinal and lateral control errors of forward traveling of the vehicle.

7. The method according to claim 1, wherein the determining the moving cost related to the length of the each candidate turn-round path based at least partially on the road information and the vehicle information comprises:
determining a weight of each edge of grids by which each candidate turn-round path passes; and
calculating a moving cost of each candidate turn-round path by summing weights of the each edge of the grids by which the each candidate turn-round path passes;
wherein the determining the weight of each edge of grids comprises:
assigning a first weight to each edge of grids according to a space of a turn-round region;
assigning a second weight to the each edge according to a distance to an obstacle;
assigning a third weight to the each edge according to a size of the vehicle; and
assigning a fourth weight to the each edge according to moving direction of the vehicle.

8. The method according to claim 1, wherein the evaluating the feasibility of the candidate turn-round path comprises:

evaluating the feasibility of the candidate turn-round path based on:
statistical information about historical success rate of historical turn-rounds associated with the starting and target positions and a distance from a rear axle center of the vehicle to a left boundary of the vehicle, and
statistical information about historical numbers of forward and backward movements of the historical turn-rounds associated with the starting and target positions and the distance from the rear axle center of the vehicle to the left boundary of the vehicle.

9. The method according to claim 1, wherein the determining, based on the evaluation on the feasibility, a turn-round path of the vehicle comprises:
determining whether the feasibility of the candidate turn-round path is higher than a predetermined threshold; and
re-determining a new candidate turn-round path according to the determination that the feasibility is lower than the predetermined threshold.

10. The method according to claim 9, wherein the determining, based on the evaluation on the feasibility, a turn-round path of the vehicle further comprises:
determining, according to the determination that the feasibility is higher than the predetermined threshold, the candidate turn-round path as the turn-round path by which the vehicle is to travel on the road.

11. An apparatus for determining a turn-round path of a vehicle, comprising:
at least one processor; and
a memory storing instructions, the instructions when executed by the at least one processor, cause the at least one processor to perform operations, the operations comprising:
determining a starting position and a target position for the vehicle to turn round on a road based on road information associated with the road, wherein the starting position and the target position for the vehicle to turn round on the road are determined by means of a topological map of the road, the topological map is implemented as a grid map, and a size of the grids is set according to a size of the vehicle or a width of lanes, and the starting position and the target position are mapped to corresponding grids in the grid map;
determining, based at least partially on the road information associated with the road and vehicle information associated with the vehicle, a candidate turn-round path between the starting position and the target position on basis of the topological map implemented as the grid map;
evaluating, before controlling the vehicle to turn round on the road according to the candidate turn-round path, feasibility of the candidate turn-round path based on: statistical information about historical success rate of historical turn-rounds associated with the starting and target positions and the vehicle information, or statistical information about historical numbers of forward and backward movements of the historical turn-rounds associated with the starting and target positions and the vehicle information; and
determining a turn-round path based on the evaluation on the feasibility, and controlling the vehicle to turn round on the road according to the determined turn-round path,
wherein the determining, based at least partially on road information and vehicle information, a candidate turn-round path comprises:

selecting a plurality of candidate turn-round paths of a type of a highest priority in available turn-round paths, wherein a priority of a three-point turn-round path is higher than a priority of a U-turn, the priority of the U-turn is higher than a priority of a detour;

determining, for each candidate turn-round path in the plurality of candidate turn-round paths between the starting position and the target position, a moving cost related to a length of the each candidate turn-round path based at least partially on the road information and the vehicle information; and selecting, based on the moving costs of the plurality of candidate turn-round paths, the candidate turn-round path from the plurality of candidate paths.

12. The apparatus according to claim 11, wherein the road information associated with the road comprises at least one of the following:
information about a type of the road,
information about a width of the road,
information about traffic element indications, or
information about obstacles on the road.

13. The apparatus according to claim 11, wherein the evaluating the feasibility of the candidate turn-round path comprises: evaluating the feasibility of the candidate turn-round path based on:
statistical information about historical success rate of historical turn-rounds associated with the starting and target positions and a length of the vehicle, and
statistical information about historical numbers of forward and backward movements of the historical turn-rounds associated with the starting and target positions and the length of the vehicle.

14. The apparatus according to claim 11, wherein the determining a candidate turn-round path is also based on the information about at least one of the starting position and the target position.

15. The apparatus according to claim 11, wherein the determining a moving cost is also based on a moving direction of the each candidate turn-round path of the plurality of candidate turn-round paths.

16. The apparatus according to claim 11, wherein the evaluating the feasibility of the candidate turn-round path comprises:
evaluating the feasibility of the candidate turn-round path based on:
statistical information about historical success rate of historical turn-rounds, the historical turn-rounds being associated with the starting and target positions and longitudinal and lateral control errors of forward traveling of the vehicle, and
statistical information about historical numbers of forward and backward movements of the historical turn-rounds associated with the starting and target positions and the longitudinal and lateral control errors of forward traveling of the vehicle.

17. The apparatus according to claim 11, wherein the determining the moving cost related to the length of the each candidate turn-round path based at least partially on the road information and the vehicle information comprises:
determining a weight of each edge of grids by which each candidate turn-round path passes; and
calculating a moving cost of each candidate turn-round path by summing weights of the each edge of the grids by which the each candidate turn-round path passes;

wherein the determining the weight of each edge of grids comprises:
assigning a first weight to each edge of grids according to a space of a turn-round region;
assigning a second weight to the each edge according to a distance to an obstacle;
assigning a third weight to the each edge according to a size of the vehicle; and
assigning a fourth weight to the each edge according to moving direction of the vehicle.

18. A non-transitory computer-readable storage medium, storing a computer program thereon, the computer program, when executed by a processor, causes the processor to perform operations, the operations comprising:
determining a starting position and a target position for a vehicle to turn round on a road based on road information associated with the road, wherein the starting position and the target position for the vehicle to turn round on the road are determined by means of a topological map of the road, the topological map is implemented as a grid map, and a size of the grids is set according to a size of the vehicle or a width of lanes, and the starting position and the target position are mapped to corresponding grids in the grid map;
determining, based at least partially on the road information associated with the road and vehicle information associated with the vehicle, a candidate turn-round path between the starting position and the target position on basis of the topological map implemented as the grid map;
evaluating, before controlling the vehicle to turn round on the road according to the candidate turn-round path, feasibility of the candidate turn-round path based on: statistical information about historical success rate of historical turn-rounds associated with the starting and target positions and the vehicle information, or statistical information about historical numbers of forward and backward movements of the historical turn-rounds associated with the starting and target positions and the vehicle information; and
determining a turn-round path based on the evaluation on the feasibility, and controlling the vehicle to turn round on the road according to the determined turn-round path,
wherein the determining, based at least partially on road information and vehicle information, a candidate turn-round path comprises:
selecting a plurality of candidate turn-round paths of a type of a highest priority in available turn-round paths, wherein a priority of a three-point turn-round path is higher than a priority of a U-turn, the priority of the U-turn is higher than a priority of a detour;
determining, for each candidate turn-round path in the plurality of candidate turn-round paths between the starting position and the target position, a moving cost related to a length of the each candidate turn-round path based at least partially on the road information and the vehicle information; and
selecting, based on the moving costs of the plurality of candidate turn-round paths, the candidate turn-round path from the plurality of candidate paths.

\* \* \* \* \*